(12) United States Patent
Zemánek et al.

(10) Patent No.: US 7,541,606 B2
(45) Date of Patent: Jun. 2, 2009

(54) METHOD AND APPARATUS FOR PROCESSING AND READING-OUT STORAGE PHOSPHOR PLATES

(75) Inventors: Vladimir Zemánek, Munich (DE);
Bernd Gerstlauer, Munich (DE);
Thomas Zehetmaier, Neufarn (DE);
Alfred Huber, Obertaufkirchen (DE)

(73) Assignee: Agfa HealthCare N.V., Mortsel (BE)

( * ) Notice: Subject to any disclaimer, the term of this patent is extended or adjusted under 35 U.S.C. 154(b) by 0 days.

(21) Appl. No.: 11/836,445

(22) Filed: Aug. 9, 2007

(65) Prior Publication Data
US 2008/0054198 A1 Mar. 6, 2008

(30) Foreign Application Priority Data
Aug. 29, 2006 (EP) .................. 06119718

(51) Int. Cl.
G03B 42/04 (2006.01)
(52) U.S. Cl. .................................... 250/584
(58) Field of Classification Search ........... 250/589; 318/685
See application file for complete search history.

(56) References Cited
U.S. PATENT DOCUMENTS

| | | | |
|---|---|---|---|
| 4,888,541 A * | 12/1989 | Russell | 318/696 |
| 4,960,994 A | 10/1990 | Mueller et al. | |
| 6,150,788 A | 11/2000 | Someya | |
| 6,369,402 B1 | 4/2002 | Gebele et al. | |
| 6,373,074 B1 | 4/2002 | Mueller et al. | |
| 6,501,088 B1 | 12/2002 | Struye et al. | |
| 7,030,404 B2 * | 4/2006 | Berger et al. | 250/589 |
| 2006/0113500 A1 | 6/2006 | Auer et al. | |

FOREIGN PATENT DOCUMENTS

| | | |
|---|---|---|
| DE | 198 59 747 C1 | 2/2000 |
| DE | 100 06 648 A1 | 8/2000 |
| EP | 1 034 443 B1 | 9/2000 |
| EP | 1 065 523 A2 | 1/2001 |
| JP | 2003-284391 A | 3/2003 |

OTHER PUBLICATIONS

European Search Report from EP 06119718.2, filed Aug. 29, 2006, not a publication.

* cited by examiner

Primary Examiner—Constantine Hannaher
(74) Attorney, Agent, or Firm—Houston Eliseeva LLP

(57) ABSTRACT

A method and to a corresponding apparatus for processing information carriers, in particular for reading out storage phosphor plates (2) for storing X-ray information, an information carrier (2) and/or a container (1) in which the information carrier (2) is located being processed, in particular being moved and/or fixed, by at least one mechanical processor (13), the processor (7) being driven by at least one stepper motor (10), and information from the information carrier (2) being read out and/or written in the information carrier. In order to simplify the processing of information carriers (2) with at the same time high precision when determining the position of the processor (13) and reduced production costs, provision is made such that a motor load is recorded which is a measure for the load of the stepper motor (10) while the processor is being driven, and information about the position of the processor (13) is deduced from the number of steps, which corresponds to the number of steps of the stepper motor (10) while the processor (13) is being driven, taking into account the motor load recorded.

35 Claims, 2 Drawing Sheets

METHOD AND APPARATUS FOR PROCESSING AND READING-OUT STORAGE PHOSPHOR PLATES

RELATED APPLICATIONS

This application claims priority to European Patent Application No. EP06119718.2, filed on Aug. 29, 2006, which is incorporated herein by reference in its entirety.

BACKGROUND OF THE INVENTION

One possibility for recording X-ray pictures is to store the X-ray radiation passing through an object, for example a patient, as a latent picture in a so-called storage phosphor layer. In order to read out the latent picture, the storage phosphor layer is irradiated with stimulation light and so stimulated into emitting emission light. The emission light, the intensity of which corresponds to the picture stored in the storage phosphor layer, is collected by an optical detector and converted into electrical signals. The electrical signals are further processed as required, and are finally made available for analysis, in particular for medical/diagnostic purposes, by displaying them on appropriate display equipment such as e.g. a monitor or printer.

A device for reading out X-ray information is known from EP 1 640 800 A1 in which a linear sampler, a clamping force sensor and light barriers are provided in order to precisely determine the position of an X-ray cassette and of a fixing element provided in order to fix the latter.

SUMMARY OF THE INVENTION

In order to simplify the control of the individual processing operations in X-ray readout devices and to reduce the production costs, it is desirable to keep to total number of position sensors as small as possible.

The invention relates to a method and to a corresponding apparatus for processing information carriers, in particular for reading out storage phosphor plates.

It is the object of the present invention to specify a method and a corresponding apparatus with which the most precise possible examination and if appropriate determination of the position of one or more mechanical processors, such as e.g. elements for fixing and/or conveying the cassette or storage phosphor plate, is achieved in a simplified and more cost-effective manner. In particular, it must be made possible to position the mechanical processors as precisely as possible.

The invention is based upon the idea of driving one or more mechanical processors by a stepper motor which implements, i.e. executes, a specific number of steps while the one or more mechanical processors are being driven and recording the motor load of the stepper motor while the processors are being driven. According to the invention, information about the respective position of the one or more mechanical processors is deduced from the number of steps implemented while the processors are being driven, taking into account the motor load. In so doing, the desired position of the one or more mechanical processors to be expected upon the basis of the number of steps implemented is checked by means of the motor load recorded.

Preferably, the number of steps to be implemented by the stepper motor while the one or more mechanical processors are being driven is pre-specified. In order to precisely determine the number of steps actually implemented by the stepper motor while being driven, this is preferably continuously recorded while the one or more mechanical processors are being driven and used to deduce, according to the invention, the information about the precise position of the processors, taking into account the motor load which is also being continuously recorded.

The motor load recorded while the one or more mechanical processors are being driven is examined here, e.g. to find out whether it exceeds a pre-specified maximum value for the motor load. If this is not the case, the desired position deduced from the number of steps therefore also corresponds to the actual position of the one or more processors. If, however, the motor load recorded while the one or more processors are being driven exceeds the pre-specified maximum value, this suggests step losses of the stepper motor while being driven.

If the motor load recorded while the one or more mechanical processors are being driven exceeds the pre-specified maximum value, with certain operational states, such as e.g. a low revolution speed of the stepper motor, the position of the mechanical processors deduced from the number of steps can be corrected in order to finally obtain the actual position of the mechanical processors.

By means of the invention, precise checking and, if required, determination of the respective position of the one or more mechanical processors are achieved. Since specification and recording of the number of steps, recording of the motor load and the subsequent deduction of the respective actual position of the processors are implemented taking into account the motor load in a control unit connected to the stepper motor, unlike the apparatuses known from the prior art, special position sensors are not required any more, and this means that the method can be simplified and the corresponding apparatus can be produced at substantially lower cost.

In one preferred embodiment of the invention, provision is made such that the stepper motor is controlled dependently upon the information deduced with regard to the position of the one or more mechanical processors. In this way e.g. the rotation speed of the stepper motor and/or the torque of the stepper motor can be reduced or increased if the actual position of the mechanical processors falls within certain positions. Therefore, e.g. between a reference position on the one hand and a position close to a cassette to be fixed on the other hand, a higher rotation speed and a lower torque of the stepper motor can be set than on subsequent path of the mechanical processors from the specified position close to the cassette towards the cassette. In this way the operation of the stepper motor can be adapted dependently upon the respective actual position of the mechanical processors to the action to be implemented with the mechanical processors, such as e.g. fixing or conveying the cassette or the storage phosphor plate so that precise positioning of the processors and implementation of the respective action is guaranteed.

Moreover, it is preferable if the stepper motor is controlled dependently upon the motor load recorded. Therefore e.g. with a motor load which exceeds a pre-specified value, the rotation speed of the stepper motor can be decreased and/or the torque of the stepper motor increased. Operation of the stepper motor can in this way be adapted precisely dependently upon the motor load respectively recorded to the action to be implemented with the one or more mechanical processors, such as e.g. fixing or conveying the cassette or the storage phosphor plate.

It is preferable if the stepper motor is controlled in such a way that the movement devices are driven without any step losses of the stepper motor. For this, the motor load is continuously detected at short intervals of time all of the time that it is being driven, preferably at intervals of one or a few motor steps, and in the case of an increased motor load which suggests the occurrence of step losses, reduces the rotation speed of the stepper motor and/or increases the torque of the stepper motor. By means of this almost continuous control of the stepper motor it is guaranteed that the position of the one or more mechanical processors deduced from the number of steps recorded corresponds to the actual position of the processors. In this way one can determine the position and position the processors particularly precisely.

In the event that the motor load recorded exceeds a pre-specified maximum value, the stepper motor is preferably controlled in such a way that any step losses occurring while operating the movement devices can be avoided or at least reduced. Depending on the application and the specific situation, the stepper motor is halted here and/or the rotation speed of the stepper motor reduced and/or the torque of the stepper motor increased. This is explained in greater detail with the example of the following three situations:

First situation: The one or more mechanical processors move at low speed, an increase in the motor load (so-called overload) being expected, such as e.g. when the processors run towards a stop. In the event of overload being detected, the stepper motor drive is halted immediately, the consequence of which is that no step losses, and so no loss of information about the current position of the one or more mechanical processors occurs. In such cases the invention is used for the sensor-free identification or search for end or start positions, and for the sensor-free identification of obstacles or running difficulties when operating the processors.

Second situation: The one or more mechanical processors are moved at higher speed, an over-load also being expected, such as e.g. due to contact with or a stop on a buffer spring system. In the event of overload being detected, the rotation speed of the motor, and so of the drive, is reduced and/or the torque of the stepper motor is increased, by means of which step losses, and so the loss of information about the actual position of the one or more mechanical processors are avoided. In this and comparable cases, the invention is used for sensor-free contact identification, such as e.g. with cassette format identification, and sensor-free running difficulty identification.

Third situation: The one or more mechanical processors are moved at higher speed, no overload being expected. In the event of overload being detected, the drive is halted immediately or slowed down over a specific, short interval of time, and finally halted (so-called "deceleration stop"). In this way, any possible step losses are greatly limited. Moreover, with the method described in connection with the first situation, the initial position of the processors can then be found again, and the movement implemented once again (so-called "retry movement"). In these cases the invention is used for sensor-free obstacle identification.

In order to control the stepper motor the electrical currents flowing through the stepper motor are preferably pre-specified dependently upon the information deduced about the position of the one or more mechanical processors and/or dependently upon the motor load recorded. These are periodic, in particular cosinusoidal and/or sinusoidal alternating current sequences which each have a frequency, an amplitude, and a specific number of periods. The frequency and/or amplitude and/or number of periods of the alternating currents is respectively pre-specified here dependently upon the deduced position of the one or more mechanical processors and/or the motor load, by means of which the rotation speed, the torque and the respective desired position of the processors is controlled. In this way, the position and movement of the processors can be adapted precisely specifically to the circumstances required when implementing individual actions, such as e.g. fixing and/or conveying the cassette or storage phosphor plate.

The invention is advantageous in all apparatuses and methods in which the positioning and position determination of one or more mechanical processors is to be implemented in a simple and precise manner with a minimum number of separate position sensors. This includes in particular apparatuses and methods in which information is written with laser beams onto information carriers such as e.g. with printers or other so-called hard copy systems, and when exposing printing plates.

In a particularly advantageous way, the invention is used when reading out storage phosphor plates. Used as an information carrier here is a storage phosphor plate for storing X-ray information, the storage phosphor plate and/or a cassette, in which the storage phosphor plate is located, being processed, and in particular being moved and/or fixed, by the mechanical processors, and the X-ray information stored in the storage phosphor plate being read out.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
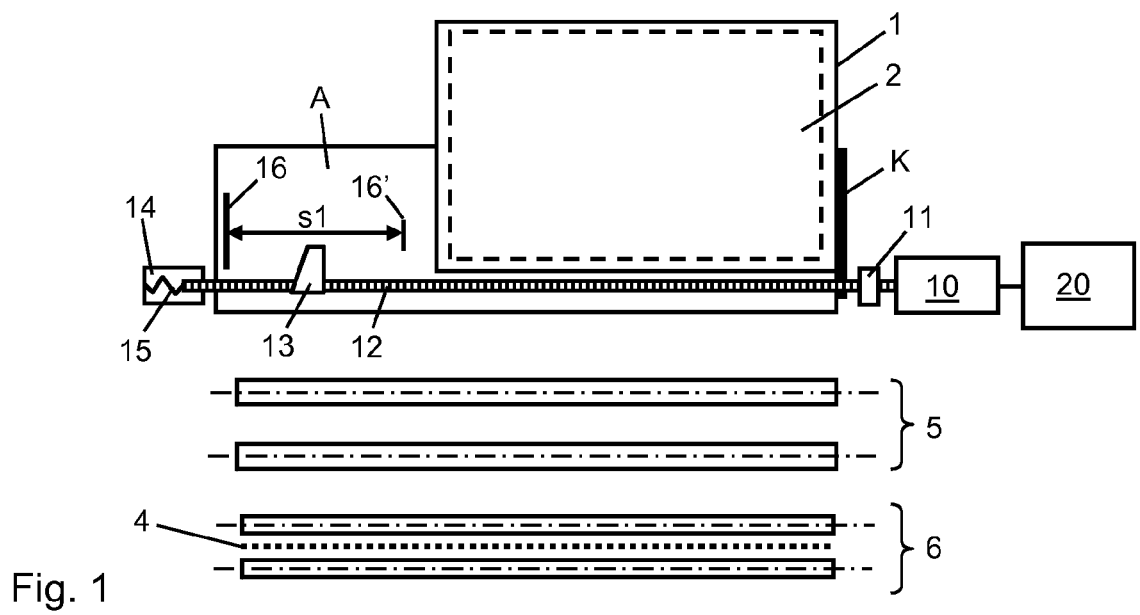
FIG. 1 is a schematic diagram showing a first exemplary embodiment used to illustrate the invention.

FIG. 1 shows a first exemplary embodiment of an apparatus for implementing the method according to the invention. A cassette 1 with a storage phosphor plate 2 located within it is set down on a repository A by an operator and abutted against a stop edge K.

In order to read out the X-ray information stored in the storage phosphor layer 2, the cassette 1 is opened and the storage phosphor plate 2 removed from the cassette 1 by means of a removal device (not shown in detail), and passed to a conveyance device 5 which in the example shown here comprises two mating rolls which convey the storage phosphor plate 2 to a read-out device 6.

In the example shown, the read-out device 6 comprises two further mating rolls which convey the storage phosphor plate 2 through a read-out unit in which the storage phosphor layer 2 is stimulated by stimulation light into emitting emission light which is collected by an optical detector (not shown). The read-out of the storage phosphor plate 2 is implemented here line by line, individual points of a line 4 being respectively irradiated with stimulation light one after the other—as with so-called flying spot scanners—or at the same time—as with so-called line scanners. The design of appropriate read-out units is described e.g. in EP 1 065 523 A2 and EP1 034 443 B1.

In the region of the repository A, a fixing element 13 is provided which can be moved towards the cassette 1 or away from the cassette 1 by a threaded rod 12. In the example shown, the fixing element 13 is a clamping wedge with a screw thread by means of which the clamping wedge is coupled to the threaded rod 12 and can be shifted by the latter.

A first end of the threaded rod 12 is coupled by a coupling 11 to a stepper motor 10 and is driven by the latter, i.e. set in rotation. A second end of the threaded rod 12 is pivotably mounted in a mounting 14 and pre-tensioned axially in the direction of the stepper motor 10 by a spring 15.

In this example the stepper motor 10 is controlled by the control unit 20 in a way such that the fixing element 13 is moved at a high speed over a first stretch s I between a reference position 16 and a position 16' close to the cassette 1. This is achieved by operating the stepper motor 10 with high frequency electrical alternating currents.

From the number of steps implemented by the stepper motor 10 for the movement of the fixing element 13, information about the respective position of the fixing element 13 in relation to the reference position 16 is calculated in a control unit 20 connected to the stepper motor 10.

In the control unit 20, as well as the number of steps implemented by the stepper motor 10, the motor load of the stepper motor 10 is also recorded, and this provides a measure for the load of the stepper motor 10 while the fixing element 13 is being moved. According to the invention, the position of the fixing element 13 is calculated from the number of steps implemented by the stepper motor 10, and this is checked, and if appropriate corrected, by means of the motor load recorded.

If, for example, the check shows that the motor load recorded exceeds a pre-specified maximum value, it can be concluded from this that an obstacle, for example the operator's hand, is present. In this event, the stepper motor 10 is halted immediately.

The situation can also arise where the cassette 1 is not placed accurately by an operator against the stop edge K, by means of which the fixing element 13 moved towards the cassette 1 comes into contact with the cassette 1 prematurely and pushes the latter over a specific stretch until the cassette 1 is abutted against the stop bar K. Along this stretch step, losses occur in the stepper motor 10 due to which the stretch s1 covered by the fixing element 13 from the reference position 16 is no longer in proportion to the recorded number of steps. Precise determination of the position of the fixing element 13 purely from the number of steps is no longer possible in this way. According to the invention, in order to check the precise actual position of the fixing element 13, the recorded motor load is used.

In the present example, on the stretch over which the cassette 1 is pushed by the fixing element towards the stop bar K an increased motor load is detected which suggests step losses of the stepper motor 10. In this case the stepper motor 10 is controlled in a way such that any step losses occurring when the fixing element 13 is being driven can be avoided, or at least reduced. In the example shown, the rotation speed of the stepper motor 10 is reduced and/or the torque of the stepper motor 10 is increased.

If the motor load recorded while the fixing element 13 is being driven exceeds a pre-specified maximum value, in certain operational states, such as e.g. with a low revolution speed of the stepper motor 10, the position of the fixing element 13 deduced from the number of steps can also be corrected in order to finally obtain the actual position of the fixing element 13. The desired position of the fixing element 13 calculated from the number of steps recorded can be corrected downwardly dependently e.g. upon the respectively recorded level of the motor load in order to establish the respective precise actual position of the fixing element 13.

Figure 2:
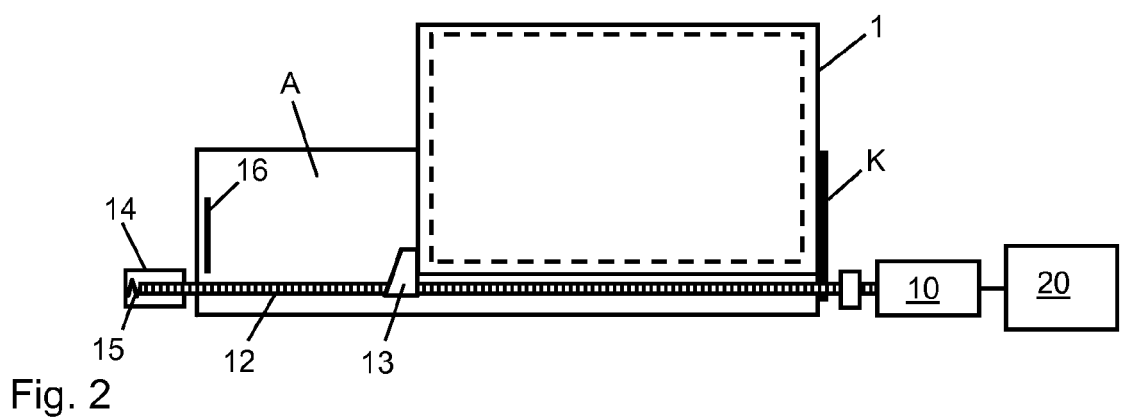
FIG. 2 is a schematic diagram showing a section of the first exemplary embodiment shown in FIG. 1 at a different point in time.

FIG. 2 shows a section of the first exemplary embodiment shown in FIG. 1 at a point in time at which the cassette 1 is fixed by the fixing element 13. Shortly before the point in time illustrated, the threaded rod 12 was conveyed in the axial direction into the mounting 14 due to the movement of the fixing element 13 already resting against the cassette 1, the spring 15 being compressed.

In the phase of compressing the spring 15, an increased motor load of the stepper motor 10 is detected in the control unit 20 which, due to the defined mechanical properties of the spring 15, comes within a characteristic value range. Preferably, in this phase the stepper motor 10 is controlled such that its rotation speed is reduced and the torque increased. In this way, on the one hand step losses are avoided, or at least reduced, and on the other hand particularly reliable and sufficiently strong clamping of the cassette 1 is made possible.

Figure 3:
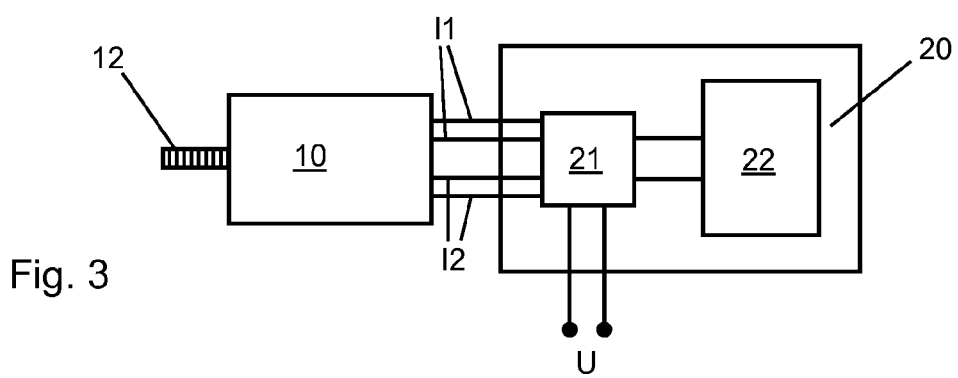
FIG. 3 is a schematic diagram showing a stepper motor with a control unit downstream.

FIG. 3 shows the multiphase motor 10 used in the first exemplary embodiment and which drives the threaded rod 12. The control unit 20 connected to the stepper motor 10 includes a motor driver unit 21 for detecting the number of steps and the motor load and for controlling the stepper motor 10. In an evaluation unit 22 the respective precise actual position of the fixing element 13 is deduced from the number of steps and the motor load, and control parameters for controlling the drive of the stepper motor 10 are sent to the motor driver unit 21. The motor driver unit 21 is connected to a direct current source with a voltage U.

Alternating currents 11 and 12 with which the stepper motor 10 is operated are pre-specified by the motor driver unit 21. These are cosinusoidal and/or sinusoidal alternating current sequences, it being possible to control the rotation speed of the stepper motor 10 by specifying the frequency of the alternating currents. The torque of the stepper motor 10 is set by specifying the amplitude of the alternating currents 11 and 12. The respective number of steps to be implemented by the stepper motor 10 is pre-specified by the number of periods in individual alternating current sequences. According to the invention, the aforementioned values are selected and specified dependently upon the number of steps recorded, which is a measure for the desired position of the fixing element 13, and/or the motor load recorded.

Figure 4:
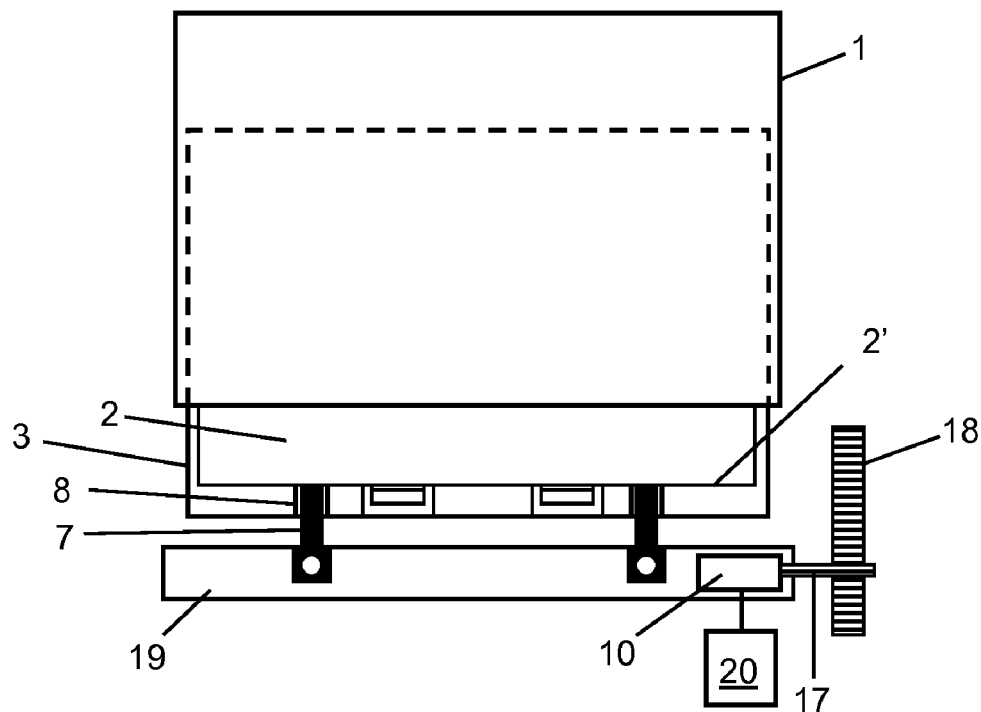
FIG. 4 is a schematic diagram showing a second exemplary embodiment used to illustrate the invention.

FIG. 4 shows a second exemplary embodiment of the invention in which a storage phosphor plate 2 located on a support 3 is pushed together with the support 3 into a cassette 1. For this, a bar 19 is provided with guide pins 7 which engage in recesses 8 in the support 3 until they are abutted against the guide edge 2' of the storage phosphor plate 2. Onto the bar 19 a stepper motor 10 is fitted which drives a spline shaft 17 which runs along a toothed rack 18 disposed immovably in relation to the cassette 1 and can thus move the bar 19 together with the guide pins 7 towards the cassette 1 or away from the cassette 1.

For precisely determining, according to the invention, the position of the guide pins 7 relative to a reference position 16, the above comments in connection with the examples shown in FIGS. 1 to 3 apply accordingly.

In this example the stepper motor 10 is controlled by the control unit 20 in a way such that initially the guide pins 7 move quickly towards the recesses 8 at high speed, and the speed of the stepper motor 10 is reduced when the guide pins 7 have reached a pre-specifiable position close to the support 3. The guide pins 7 are then engaged in the recesses 8 at a speed which is reduced in relation to the initial speed and finally push the support 3 together with the storage phosphor plate 2 located on top of it into the cassette 1.

Figure 5:
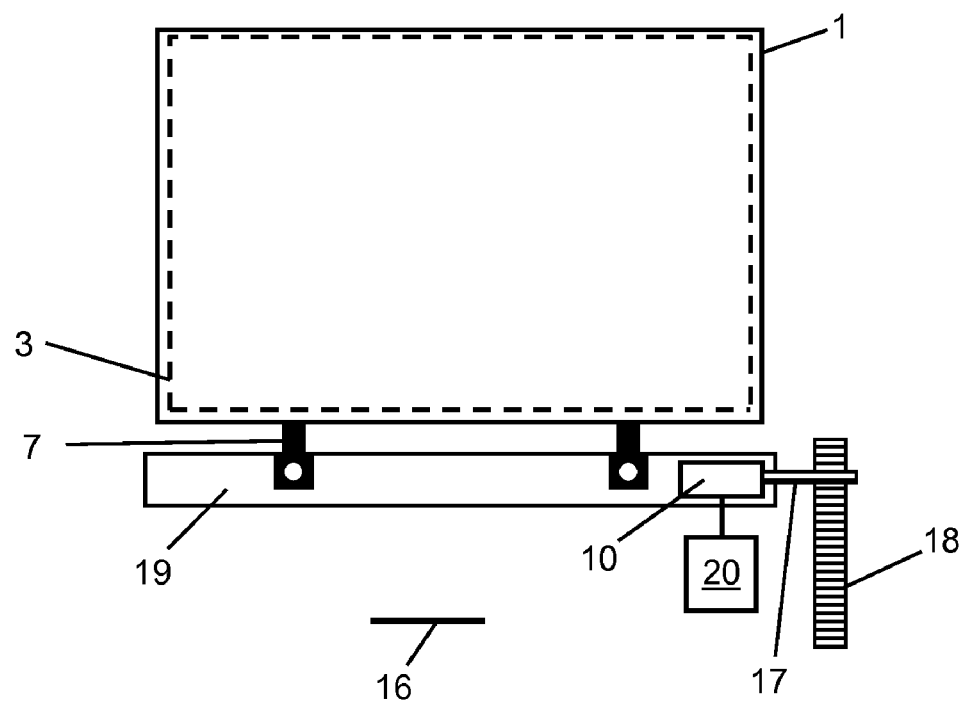
FIG. 5 is a schematic diagram showing the second exemplary embodiment shown in FIG. 4 at a different point in time.

By successively, almost continuously recording the motor load of the stepper motor 10 it can be established here whether the support 3—as shown in FIG. 5—is already fully pushed into the cassette 1 and is abutted against the opposite face side of the cassette or against a stop located here. In this case a high motor load is detected in the control unit 20, and directly thereupon the conveyance of the support 3 and the storage phosphor plate 2 back into the cassette 1 is ended by the rotation of the stepper motor 10 being halted.

In this way reliable and precise conveyance of the support 3 together with the storage phosphor plate 2 located on top of it back into the cassette 1 is achieved.

After fixing the support 3 together with the storage phosphor plate 2 in the cassette 1 the stepper motor 10 can now be operated in the opposite rotation direction at relatively high speed in order to bring the bar 19 together with the guide pins 7 back into the reference position 16. This movement is also initially implemented at high speed and close to the reference position 16 at reduced speed. By successively recording the motor load and taking this into account both when establishing the actual position of the bar 19 and when controlling the stepper motor 10 it is guaranteed that the reference position 16 is approached and finally reached with a high level of reliability and precision.

In the exemplary embodiments described in detail above, only two possibilities were shown with which processors, such as the fixing element 13 and the guide pins 7, can be operated according to the invention when processing and reading out storage phosphor plates. Furthermore, there are numerous further possibilities for using the described invention.

Therefore, for example, the distance between the rolls of mating rolls, as in the conveyance device 5 shown in FIG. 1, can be set by means of a guide rail which is in turn driven by a stepper motor operated according to the invention.

Further examples of use of the invention are driving devices for opening and closing a flap located on the face side of the cassette, driving mechanisms for fixing and releasing the storage phosphor plate in the cassette, and driving devices for conveying the storage phosphor plate through the apparatus, in particular through the read-out unit, such as e.g. rolls, threaded rods or cables.

In general the invention can advantageously be used for implementing and controlling any mechanical procedures in connection with processing information carriers. As well as precisely determining the position of and controlling mechanical processors, such as e.g. fixing and/or conveyance elements, a further advantage of the invention is that one can dispense with a plurality of different sensors for determining the position of and controlling mechanical processors. The production costs of corresponding systems are considerably reduced in this way.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing information carriers in which an information carrier and/or a container, in which the information carrier is located, is processed by being moved and/or fixed, by at least one mechanical processor, the mechanical processor being driven by at least one stepper motor that rotates with a rotation speed and a torque, and information from the information carrier being read out and/or written in the information carrier, the method comprising:
    recording a motor load which is a measure for the load of the stepper motor while the mechanical processor is being driven,
    deducing information about a position of the processor from a number of steps, which corresponds to the number of steps of the stepper motor while the processor is being driven, taking into account the motor load recorded and controlling the stepper motor in response to information deduced about a position of the mechanical processor, and
    reducing or increasing the rotation speed and/or the torque of the stepper motor when the position of the mechanical processor lies within pre-specified positions.

2. The method according to claim 1, wherein the rotation speed is higher between a reference position and a position close to the information carrier and/or the container than between the position close to the information carrier and/or the container and the information carrier and/or the container.

3. The method according to claim 1, wherein the torque between a reference position and a position close to the information carrier and/or the container is lower than between the position close to the information carrier and/or the container and the information carrier and/or the container.

4. The method according to claim 1, wherein while the mechanical processor is being driven, the motor load is continuously recorded at intervals of time of one or a few steps of the stepper motor and the stepper motor is continuously controlled.

5. The method according to claim 1, wherein the number of steps which the stepper motor is to implement while the mechanical processor is being driven is pre-specified.

6. The method according to claim 1, wherein the number of steps for the steps of the stepper motor implemented while the mechanical processor is being driven is recorded while the processor is being driven.

7. The method according to claim 1, wherein, in order to control the stepper motor, electrical currents flowing through the stepper motor are pre-specified dependently upon the information deduced about the position of the mechanical processor and/or dependently upon the motor load recorded.

8. The method according to claim 7, wherein the electrical currents through the stepper motor are periodic having a frequency, an amplitude and a specific number of periods, and the frequency and/or the amplitude and/or the number of periods of the currents being respectively pre-specified dependently upon the information deduced about the position of the mechanical processor and/or dependently upon the motor load recorded.

9. The method according to claim 1, wherein the information carrier is a storage phosphor plate for storing X-ray information, and the storage phosphor plate and/or a cassette, in which the storage phosphor plate is located, is processed, being moved and/or fixed, by the mechanical processor, and the X-ray information stored in the storage phosphor plate is read out.

10. A method for processing information carriers in which an information carrier and/or a container, in which the information carrier is located, is processed by being moved and/or fixed, by at least one mechanical processor, the mechanical processor being driven by at least one stepper motor, and information from the information carrier being read out and/or written in the information carrier, the method comprising:
   recording a motor load which is a measure for the load of the stepper motor while the mechanical processor is being driven,
   deducing information about a position of the processor from a number of steps, which corresponds to the number of steps of the stepper motor while the processor is being driven, taking into account the motor load recorded, and
   controlling the stepper motor in response to the motor load and in response to the motor load exceeding a pre-specified maximum value controlling the stepper motor to avoid or reduce step losses.

11. The method according to claim 10, wherein, in the event that the motor load recorded exceeds the pre-specified maximum value, the stepper motor is halted and/or the rotation speed of the stepper motor is reduced and/or the torque of the stepper motor is increased.

12. The method according to claim 10, wherein while the mechanical processor is being driven, the motor load is continuously recorded at intervals of time of one or a few steps of the stepper motor and the stepper motor is continuously controlled.

13. The method according to claim 10, wherein the number of steps which the stepper motor is to implement while the mechanical processor is being driven is pre-specified.

14. The method according to claim 10, wherein, in order to control the stepper motor, electrical currents flowing through the stepper motor are pre-specified dependently upon the information deduced about the position of the mechanical processor and/or dependently upon the motor load recorded.

15. The method according to claim 10, wherein the information carrier is a storage phosphor plate for storing X-ray information, and the storage phosphor plate and/or a cassette, in which the storage phosphor plate is located, is processed, being moved and/or fixed, by the mechanical processor, and the X-ray information stored in the storage phosphor plate is read out.

16. A method for processing information carriers in which an information carrier and/or a container, in which the information carrier is located, is processed by being moved and/or fixed, by at least one mechanical processor, the mechanical processor being driven by at least one stepper motor, and information from the information carrier being read out and/or written in the information carrier, the method comprising:
   recording a motor load which is a measure for the load of the stepper motor while the mechanical processor is being driven,
   deducing information about a position of the processor from a number of steps, which corresponds to the number of steps of the stepper motor while the processor is being driven, taking into account the motor load recorded, and
   controlling the stepper motor in response to the motor load and moving the mechanical processor at a first speed by the stepper motor, and in the event of detection of an increase in the motor load the mechanical processor is halted.

17. The method according to claim 16, wherein the stepper motor is controlled such that the processor is moved at a second speed, and in the event of detection of an increase in the motor load, the rotation speed of the stepper motor is reduced and/or the torque of the stepper motor is increased.

18. The method according to claim 17, wherein the first speed of the mechanical processor is lower than the second speed of the processor.

19. The method according to claim 16, wherein while the mechanical processor is being driven, the motor load is continuously recorded at intervals of time of one or a few steps of the stepper motor and the stepper motor is continuously controlled.

20. The method according to claim 16, wherein the number of steps which the stepper motor is to implement while the mechanical processor is being driven is pre-specified.

21. The method according to claim 16, wherein, in order to control the stepper motor, electrical currents flowing through the stepper motor are pre-specified dependently upon the information deduced about the position of the mechanical processor and/or dependently upon the motor load recorded.

22. The method according to claim 16, wherein the information carrier is a storage phosphor plate for storing X-ray information, and the storage phosphor plate and/or a cassette, in which the storage phosphor plate is located, is processed, being moved and/or fixed, by the mechanical processor, and the X-ray information stored in the storage phosphor plate is read out.

23. A method for processing information carriers in which an information carrier and/or a container, in which the information carrier is located, is processed by being moved and/or fixed, by at least one mechanical processor, the mechanical processor being driven by at least one stepper motor, and information from the information carrier being read out and/or written in the information carrier, the method comprising:
   recording a motor load which is a measure for the load of the stepper motor while the mechanical processor is being driven,
   deducing information about a position of the processor from a number of steps, which corresponds to the number of steps of the stepper motor while the mechanical processor is being driven at a first speed, taking into account the motor load recorded, and
   controlling the stepper motor in response to the motor load and moving the mechanical processor at a predetermined speed, and in the event of detection of an increase in the motor load, slowing the rotation of the stepper motor down and finally halting the stepper motor within a pre-specified interval of time.

24. The method according to claim 23, wherein while the mechanical processor is being driven, the motor load is continuously recorded at intervals of time of one or a few steps of the stepper motor and the stepper motor is continuously controlled.

25. The method according to claim 23, wherein the number of steps which the stepper motor is to implement while the mechanical processor is being driven is pre-specified.

26. The method according to claim 23, wherein, in order to control the stepper motor, electrical currents flowing through the stepper motor are pre-specified dependently upon the information deduced about the position of the mechanical processor and/or dependently upon the motor load recorded.

27. The method according to claim 23, wherein the information carrier is a storage phosphor plate for storing X-ray information, and the storage phosphor plate and/or a cassette, in which the storage phosphor plate is located, is processed, being moved and/or fixed, by the mechanical processor, and the X-ray information stored in the storage phosphor plate is read out.

28. An apparatus for processing information carriers, comprising:
at least one mechanical processor for processing, including moving and/or fixing, an information carrier and/or a container in which the information carrier is located;
at least one stepper motor by means of which the processor is driven;
a device for reading out and/or writing information from and in the information carrier; and
a control unit for recording a motor load which is a measure for the load of the stepper motor while the mechanical processor is being driven, deducing information about the position of the mechanical processor from a number of steps, which corresponds to the number of steps of the stepper motor while the mechanical processor is being driven, taking into account the motor load recorded, and controlling the stepper motor in response to the motor load and in response to the motor load exceeding a pre-specified maximum value to avoid or reduce step losses.

29. The apparatus according to claim 28, wherein the information carrier is a storage phosphor plate for storing X-ray information and the storage phosphor plate and/or a cassette, in which the storage phosphor plate is located, is processed by the mechanical processor for a read-out device for reading out the X-ray information stored in the storage phosphor plate.

30. An apparatus for processing information carriers, comprising:
at least one mechanical processor for processing, including moving and/or fixing, an information carrier and/or a container in which the information carrier is located;
at least one stepper motor by means of which the processor is driven;
a device for reading out and/or writing information from and in the information carrier; and
a control unit for recording a motor load which is a measure for the load of the stepper motor while the mechanical processor is being driven, deducing information about the position of the mechanical processor from a number of steps, which corresponds to the number of steps of the stepper motor while the mechanical processor is being driven, taking into account the motor load recorded, and controlling the stepper motor in response to the motor load by halting the mechanical processor in response to detection of an increase in the motor load.

31. The apparatus according to claim 30, wherein the information carrier is a storage phosphor plate for storing X-ray information and the storage phosphor plate and/or a cassette, in which the storage phosphor plate is located, is processed by the mechanical processor for a read-out device for reading out the X-ray information stored in the storage phosphor plate.

32. An apparatus for processing information carriers, comprising:
at least one mechanical processor for processing, including moving and/or fixing, an information carrier and/or a container in which the information carrier is located;
at least one stepper motor by means of which the processor is driven;
a device for reading out and/or writing information from and in the information carrier; and
a control unit for recording a motor load which is a measure for the load of the stepper motor while the mechanical processor is being driven, deducing information about the position of the mechanical processor from a number of steps, which corresponds to the number of steps of the stepper motor while the mechanical processor is being driven, taking into account the motor load recorded, and reducing or increasing the rotation speed and/or the torque of the stepper motor when the position of the mechanical processor lies within pre-specified positions.

33. The apparatus according to claim 32, wherein the information carrier is a storage phosphor plate for storing X-ray information and the storage phosphor plate and/or a cassette, in which the storage phosphor plate is located, is processed by the mechanical processor for a read-out device for reading out the X-ray information stored in the storage phosphor plate.

34. An apparatus for processing information carriers, comprising:
at least one mechanical processor for processing, including moving and/or fixing, an information carrier and/or a container in which the information carrier is located;
at least one stepper motor by means of which the processor is driven;
a device for reading out and/or writing information from and in the information carrier; and
a control unit for recording a motor load which is a measure for the load of the stepper motor while the mechanical processor is being driven, deducing information about the position of the mechanical processor from a number of steps, which corresponds to the number of steps of the stepper motor while the mechanical processor is being driven, taking into account the motor load recorded, and controlling the stepper motor in response to the motor load and in response to the motor load exceeding a pre-specified maximum value slowing the rotation of the stepper motor down and then halting the stepper motor within a pre-specified interval of time.

35. The apparatus according to claim 34, wherein the information carrier is a storage phosphor plate for storing X-ray information and the storage phosphor plate and/or a cassette, in which the storage phosphor plate is located, is processed by the mechanical processor for a read-out device for reading out the X-ray information stored in the storage phosphor plate.

* * * * *